United States Patent [19]

Wallace

[11] 4,336,284

[45] Jun. 22, 1982

[54] METHOD FOR PRETREATING COAL FLY ASH

[76] Inventor: Richard A. Wallace, 7304 SW. 53rd Ave., Portland, Oreg. 97219

[21] Appl. No.: 216,256

[22] Filed: Dec. 15, 1980

[51] Int. Cl.³ .......................... B05D 7/00; B32B 3/00; C08K 9/02; C08K 9/04; C08K 9/06
[52] U.S. Cl. .................................... 427/213; 427/220; 428/404; 428/405; 523/212; 523/213; 523/216
[58] Field of Search ............. 428/404, 405; 260/40 R, 260/42.14, 42.15; 427/213, 220

[56] References Cited

U.S. PATENT DOCUMENTS

| 3,846,366 | 11/1974 | Wallace | 260/40 R |
| 3,896,060 | 7/1975 | Plunguian et al. | 260/40 R |
| 3,917,547 | 11/1975 | Massey | 428/406 |
| 4,243,575 | 1/1981 | Myers et al. | 525/146 |

FOREIGN PATENT DOCUMENTS 1200723  7/1970  United Kingdom .

OTHER PUBLICATIONS

Chem. Abstracts, 79 67907; 80 28093; 80 122051; 82 99036; 83 60184; 83 180463; 84 45147; 84 123167; 85 79752; 85 95962; 85 193608; 86 17668; 87 152952; 90 55655; 90 105753; 93 25261; 94 70312; 94 122584; 94 140703; 95 66896.

*Primary Examiner*—James C. Cannon

[57] ABSTRACT

A method of pretreating coal fly ash is presented having an essentially monomolecular partial coating of under 100 angstroms thickness for obtaining improved compatibility with organic polymers and resins. The partial coverage is selected from the long-chain organic group including organotitanates, organofunctional silanes and stearic acids, with the former being preferable. The amount of chemical pretreatment compound required is preferably from 0.01 to 0.09 parts, per 100 parts of coal fly ash.

1 Claim, 4 Drawing Figures

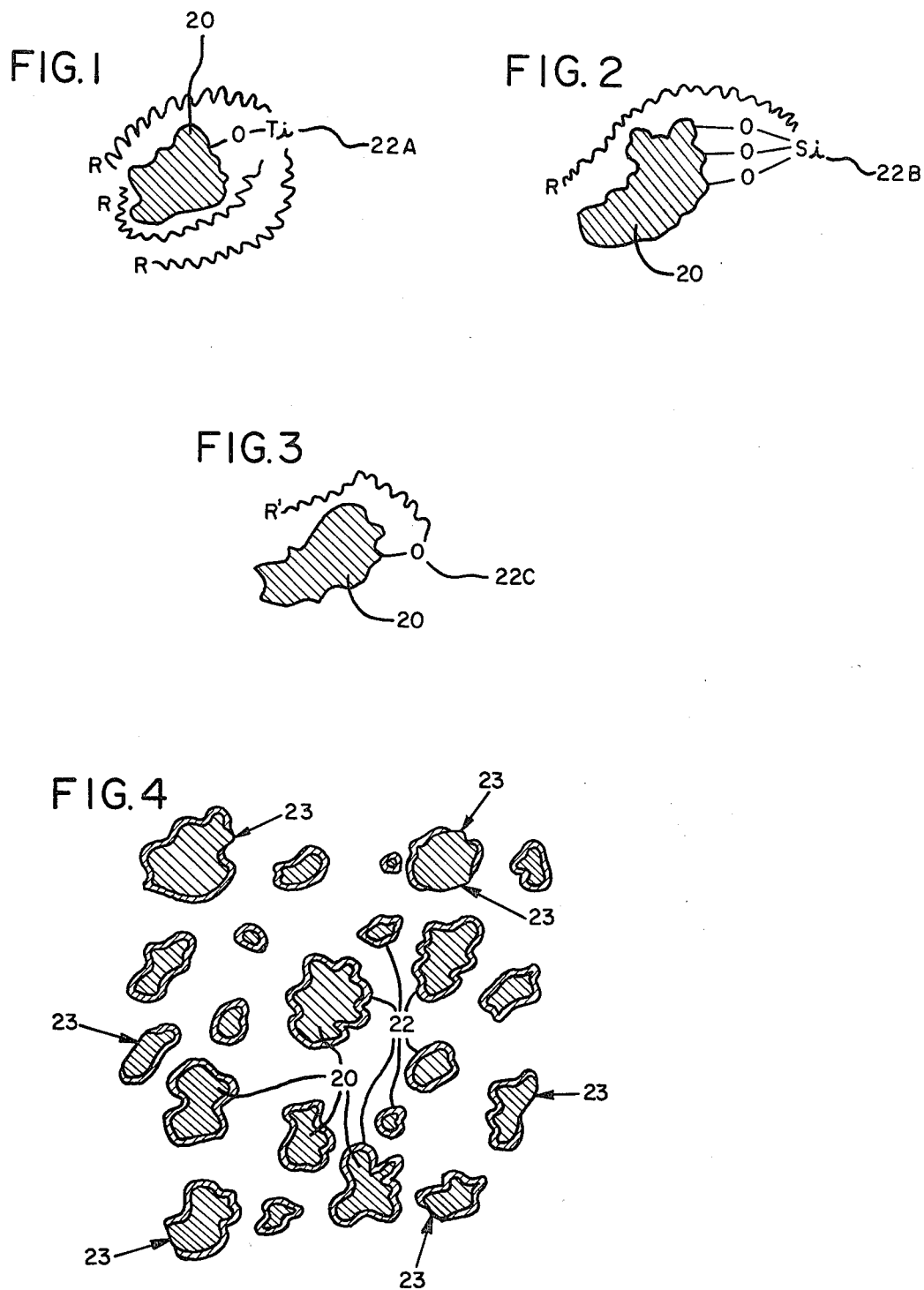

METHOD FOR PRETREATING COAL FLY ASH

BACKGROUND OF THE INVENTION

The present invention relates generally to using inert fillers dispersed throughout a polymeric resin and more particularly relates to using a waste material, coal fly ash, as such filler.

Chemical agents, such as organo-functional silanes, stearic acids and organotitanates have been applied to a number of powdered inorganic materials; namely glass, sand, metals, clays and metallic oxides. These chemically pretreated surfaces promote an enhanced bond between the inorganic filler particles and the organic polymer or resin. At present, chemical surface pretreatment of coal fly ash has not been reported or commercially used and there are contraindications to the use of coal fly ash as a filler for polymers and resins.

Known related art includes U.S. Pat. Nos. 3,846,366 and 3,991,005 issued respectively on Nov. 5, 1974 and Nov. 9, 1976 to Richard A. Wallace, together with articles entitled: A NEW COUPLING AGENT FOR EXTENDERS, FILLERS, AND REINFORCEMENTS USED IN POLYMERS, *J. Elastomers and Plastics*, Vol 8, 30 Jan. 1967 by S. J. Monte, G. Sugerman and P. F. Bruins: and, SILANE ADHESION PROMOTERS, *Modern Plastics Encyclopedia*, 260, 1974-75 by C. A. Bergeson.

Coal fly ash is produced as waste residue during operation of coal-fired power houses. It is collected by mechanical collectors, bag filters or electrostatic precipitators suitably mounted in flues of the boilers of such installations.

About six to ten percent of the coal fed to the boilers must ultimately be disposed of as coal fly ash. A typical installation will regularly produce many tons of fly ash per day. The power houses must absorb the costs of labor and equipment for disposal of this ash. Further, ecological considerations are compounding the problem by making it more difficult to locate acceptable disposal sites.

Several alternatives have been suggested. Public utilities have used coal fly ash as both concrete additives and as components in highway paving compounds. More importantly there have been questions of using coal fly ash to fill polypropylene. See FLY ASH FILLED POLYPROPYLENE, *General Motors Research Publication GMR*-2578, Oct. 27, 1977 by R. L. Kaas.

Several contraindications are present which have heretofore taught against the use of coal fly ash as an elastomer or polymer filler. Primarily, coal fly ash has inherent variability in its typical chemical composition, especially the carbon content. Table 1 lists typical chemical components of coal fly ash.

TABLE 1

Silica 47.4%; Alumina 22.7%; Ferric Oxide 16.7% Sulfer Trioxide 1.2%; Magnesium Oxide 0.1%; Calcium Oxide 1.0%; Titanium Oxide 1.9%; Metals and other Oxides 2.0%; Moisture 1.3% and Unburnt Carbon 5.7%

Chemical variability causes jaggedness which causes abrasiveness (for example unburnt carbon) of coal fly ash could yield changes in rheological flow as well as variable mechanical properties of any resultant polymeric composite. Specifically, as noted by R. L. Kaas, unnotched impact and wet strengths of coal fly ash-filled thermoplastics (assuming identical percentage loading and particle size and distribution) are markedly lower than those for talc-filled thermoplastics.

Poor compatibility of uncoated fly ash with an organic phase necessitates a pre-mixing step or two-roll mill at elevated temperature (R. L. Kaas, General Motors Research Publication).

Flexual strengths and elongations at break are also inferior to those of talc-filled thermoplastics as is also noted by R. L. Kass. These inferior mechanical properties are due to inefficient wetability and poor to moderate bonding between two dissimilar surfaces (those of the coal fly ash and of the organic polymer. It is noted that water has mechanical destructive influence in the already poor adhesion between polymer and coal fly ash.

Still another contraindication is the high abrasion resistance of the rough and irregular coal fly ash which typically has predominately irregular, jagged particles with length to width ratios of about one. This property, in machine-assisted polymer processing, could cause extreme wear of molding machines thereby causing frequent replacement of worn parts. For each of these reasons, and because known coating methods are cost prohibitive, polymer processors and compounders do not use the non-uniform and variable coal fly ash. Conversly, increasing relative scarcity of petroleum together with ecological and disposal costs considerations indicate that if the contraindications could be overcome, the resultant coal fly ash-filled polymers and elastomers would be of significant importance.

SUMMARY OF THE INVENTION

The present invention is based upon the discovery that partially coating coal fly ash with an essentially monomolecular hydrophobic layer of chemical agent is both cost feasible and synergistically converts the treated inorganic fly ash particles into a form which is compatible and functional in organic systems.

As used in this specification, the term partially coated means incomplete coverage of the chemical pretreatment compound on the surface of the coal fly ash particals. The coating on the coal fly ash can vary from 1 to 99 percent coverage.

The agent is selected from the long-chain organic group including stearic acids, organo-functional silanes and organotitanates. Attachment of the long-chain organic group agent causes a marked increase in coal fly ash surface energy and its surface is effectively converted to a hydrophobic and compatible interface for strong bonding between coal fly ash particles and resins for filled-polymer end products.

Organotitanates are unusually effective to promote wetting, flow, viscosity reduction and impact strengths. Further, chemical pretreatment of coal fly ash aids dispersement when incorporated in resin or polymer.

The pretreatment agent is applied in the form of a spray or mist for achieving an essentially monomolecular partial coating. Typical concentrations are in the range of from 0.005 to 0.09 weight percent (based on the weight of the coal fly ash). An optimum concentration must be approximated, weighing pretreatment costs against beneficial resultant properties. For example, a weight percent between 0.03 and 0.09 (based on weight of coal fly ash) was used and determined to be cost effective.

A particular object of the invention is providing an essentially monomolecular hydrophobic layer on coal fly ash particles to markedly enhance physical properties of filled polymeric or elastomeric composites.

Another object is providing a continuous method for partially coating surfaces of coal fly ash particles with a chemical agent selected from the long-chain organic group including organotitanates organo-functional silanes and stearic acids to create highly effective primer organophillic surfaces for adhesion promotion.

A further object is improving flow in molding machines injection and extrusion processes relative to coal fly ash-filled polymers and elastomers.

Yet another object is providing treated coal fly ash for use in polymeric and elastomeric processes to obtain markedly higher impact and wet strengths in resultant composites over a wide range of temperatures and moistures.

Yet further objects, features and advantages of the invention will become apparent and the invention will be more readily understood from the accompanying drawings and from the descriptions and claims which follow.

BRIEF DESCRIPTION OF THE DRAWINGS

FIG. 1 is a greatly magnified perspective of a coal fly ash particle partially coated with a bonding titanate pretreatment agent.

FIG. 2 is a greatly magnified view of a coal fly ash particle coated with an organosilane.

FIG. 3 is a greatly magnified view of a coal fly ash particle coated with stearic acid.

FIG. 4 is a greatly magnified view of coal fly ash particles depicting typical particle size distribution and the chemically-bonded hydrophobic, partial layer of the present invention having a thickness below 100 angstroms.

DETAILED DESCRIPTION OF THE INVENTION

Referring now to the drawings there is shown a particle 20 of coal fly ash having a monomolecular hydrophobic coating of bonding chemical agent 22A-C.

The chemical agent 22 is selected from the long-chain organic group including organotitanates 22A, organo-functional silanes 22B and stearic acids 22C. These are best seen in FIGS. 1-3 respectively.

The coal fly ash particles 20 are first prepared by grinding same into a powdered form, preferably less than 40 microns. The product is then completed by flowing small amounts (less than a tenth percent by weight) of the chemical agent in mist, liquid or vapor form over the coal fly ash particles 20, while simultaneously agitating the coal fly ash particles. This achieves partial coating (arrow 23, FIG. 4).

Preferably, the fly ash particles 20 are continuouly moved by means of a conveyor belt through a spray mixer using a fluidized bed type action. The pretreating process is operable either continuosly or in batching operations.

The present process is then completed by feeding the pretreated coal fly ash particles 20 and 22 into a large hopper and from there, under the force of gravity into bagging operation.

Typical treating solution is 0.5% aqueous-aminopropyl-triethoxysilane (molecular weight 221) made by Union Carbide Corp, Silicones Division; Isopropyl triisostearoyl titanate coagent, called "KEN-REACT TTS" manufactured by Kenrich Petrochemicals of Bayonne, N.J.

EXAMPLE 1

A monolkoxy titanate layer is partially applied to agitated coal fly ash to a 0.05% by weight based on coal fly ash (1-30 micron range). Chemical pretreatment is by spray mist. The maximum titanate layer thickness to the coal fly ash is determined to be about 75-100 angstroms. An alternate method is by dry blending the titanate surface agent together with coal fly ash in a mixer.

The pre-treated coal fly ash is continuously bagged into 100 pound bags or other large containers for shipment to customers such as resin or polymer users.

Since a polymer does not chemically interact with uncoated (non-treated) coal fly ash, marked improvements in flexural strengths and impact strengths are obtained in the resultant pre-treated coal fly ash composites.

The organotitanate forms a nearly monomolecular partial coverage on the surface of the rough irregular-shaped fly ash particles. This hydrophobic and organophillic layer sharply reduces the surface energy of the fly ash, resulting in a marked reduction in abrasion resistance, particularly when used in filled polymers during processing.

A synergistic effect is created, that is, high fly ash loading becomes achievable without the high abrasion produced otherwise in molding units. Further, as a result of significantly improved wetting between the titanate-treated coal fly ash and matrix polymer, the presence of microvoids are significantly reduced enhancing mechanical composite strengths both wet and dry, by eliminating stress concentrators.

EXAMPLE 2

In a second example, stearic acid in an amount of nine parts to ten thousand parts of coal fly ash has been applied and resulted in improved wet and dry strengths. The presence of the stearate partial layer on the surfaces of the fly ash particles drastically lowers surface tension and increases surface lubricity of the pretreated coal fly ash.

The maximum thickness of the stearate monomolecular coating is between 50-100 angstroms, based upon chemical bond dimensions.

After pretreatment, the stearic acid-coated coal fly ash is then bagged and shipped to end users.

EXAMPLE 3

Organo-functional silanes are used to chemically alter or prime the surfaces of coal fly ash particles and to promote physical properties retention of fly ash-filled composites.

The pretreatment agent is 0.5% Union Carbide amino silane. An end concentration of 0.08% by weight relative to coal fly ash of one to thirty micron particle size has been used. The silane-pretreatment coal fly ash shows a marked retention of mechanical strength after extended exposure to moisture-laden atmospheres. An enhanced water-resistant bonding between coal fly ash and polymer has been effectuated.

Experiments demonstrate that pretreated coal fly ash is effectively usable with phenolics, furans, epoxies and polyesters thermosets. The hydrophobic surface pretreatment significantly upgrades physical and wet strength properties of coal fly ash-filled composites. This good adhesive strength of resin to fly ash interface is essential in as much as mechanical stress is mostly transmitted in shear by interfacial surfaces of the fly ash particles.

EXAMPLE 4

Two other chemical agents; namely triethoxy vinyl silane dispersed in aqueous solution and stearic acid are also employed. The same procedure is followed as described in Example 1. A final concentration of five parts silane or stearic acid to 10,000 parts of powdered coal fly ash, that is, 0.05% (under 40 micron particle size range) has been used. Marked improvements in rheological flow behavior and wet and dry mechanical strengths of 50% by weight pretreated coal fly ash as well as 75% by weight treated coal fly ash-filled coumarone-indene resins have been determined.

The terms used in the foregoing abstract and descriptions were used as terms of illustration and not as terms of limitation and there is no intent to waive equivalents to the features shown and described, it being understood that the scope of the invention is defined by the claims which follow.

What is claimed is:

1. A method for pretreating coal fly ash to obtain a partial monomolecular hydrophobic coating comprising the steps of:
   (a) grinding predetermined quantities of non-uniform coal fly ash thereby obtaining predetermined quantities of coal fly ash powder;
   (b) continuously moving said coal fly ash powder through a spray mixer using a fluidized bed type action so as to move and simultaneously agitate said powder;
   (c) selecting a chemical agent from the long-chain organic group including stearic acid, organo-functional silanes and organotitanates;
   (d) during said agitation of said powder, flowing in the range from 0.005% to 0.09% by weight, small amounts of said agent in any of mist, liquid and vapor form over said agitated powder thereby obtaining a partial monomolecular hydrophobic coating on the particles of said agitated powder which varies in particle coverage from one percent to 99 percent coverage of the surfaces of said particles throughout said quantities of said agitated powder; and
   (e) feeding said partially coated powder into a hopper for bagging operations.

* * * * *